(12) United States Patent
Goto et al.

(10) Patent No.: US 6,618,531 B1
(45) Date of Patent: Sep. 9, 2003

(54) VARIABLE WAVELENGTH SHORT PULSE LIGHT GENERATING DEVICE AND METHOD

(75) Inventors: Toshio Goto, Nisshin (JP); Norihiko Nishizawa, Nagoya (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 09/787,609

(22) PCT Filed: Sep. 28, 1999

(86) PCT No.: PCT/JP99/05276
§ 371 (c)(1),
(2), (4) Date: Mar. 20, 2001

(87) PCT Pub. No.: WO00/19268
PCT Pub. Date: Apr. 6, 2000

(30) Foreign Application Priority Data

Sep. 29, 1998 (JP) .............................. 10-275604

(51) Int. Cl.[7] .............................. G02F 1/35; G02B 6/00

(52) U.S. Cl. .......................... 385/122; 385/27; 359/327

(58) Field of Search ........................ 385/122, 31, 27; 359/327

(56) References Cited

U.S. PATENT DOCUMENTS

| 4,633,524 A | 12/1986 | Hasegawa ................ 455/612 |
|---|---|---|
| 4,741,587 A | 5/1988 | Jewell et al. |
| 4,958,910 A | 9/1990 | Taylor et al. |
| 5,440,573 A * | 8/1995 | Fermann ................ 372/18 |
| 5,600,479 A * | 2/1997 | Evans ................ 359/237 |
| 2002/0168161 A1 * | 11/2002 | Price et al. ................ 385/123 |
| 2003/0043451 A1 * | 3/2003 | Kato et al. ................ 359/326 |

OTHER PUBLICATIONS

M. E. Fermann et al. Ultrawide tunable Er soliton fiber laser amplified in Yb–doped fiber. Optics Letters, vol. 24 No. 20, pp. 1428–1430. Oct. 15, 1999.*
J.P. Gordon, Theory of the soliton self–frequency shift. Optics Letters, vol. 11 No. 10, pp. 662–664. Oct. 1996.*
J.K. Lucek, Optical–intensity dependent switching using soliton self–frequency shift. Electronic Letters, vol. 27 No. 10, pp. 882–884. May 1991.*
IEEE Journal of Quantum Electronics, vol. 24, No. 2, (Feb. 1988) pp. 332–340.
Optics Letters, vol. 11, No. 10 (Oct. 1986), pp. 133–135.
IEEE Photonics Technology Letters, vol. 11, No. 4, (Apr. 1999), pp. 421–423.
IEEE Photonics Technology Letters, vol. 11, No. 3, (Mar. 1999), pp. 325–327.
IEEE Journal of Quantum Electronics, vol. QE–23, No. 11, pp. 1938–1946 (1987) (Nov.).
Optics Letters, vol. 11, No. 10, pp. 659–661 (1986) (Oct.).

* cited by examiner

Primary Examiner—John D. Lee
Assistant Examiner—Mike Stahl
(74) Attorney, Agent, or Firm—Lorusso, Loud & Kelly

(57) ABSTRACT

A compact apparatus and a method for generating wavelength-tunable short optical pulses, which apparatus and method can change the wavelength of generated pulses without adjustment of an optical system and enable generation of ideal femtosecond soliton pulses. The apparatus includes a short-optical-pulse source, an optical characteristic regulation unit for regulating characteristics of light output from the short-optical-pulse source, and an optical fiber for receiving input pulses from the optical characteristic regulation unit and for changing the wavelength of output pulses linearly. Short optical pulses are input to the optical fiber, so that new soliton pulses are generated in the optical fiber due to its nonlinear effect. Further, the nonlinear effect enables the wavelength of the soliton pulses to shift linearly in accordance with the intensity of input light.

20 Claims, 12 Drawing Sheets

F I G. 10
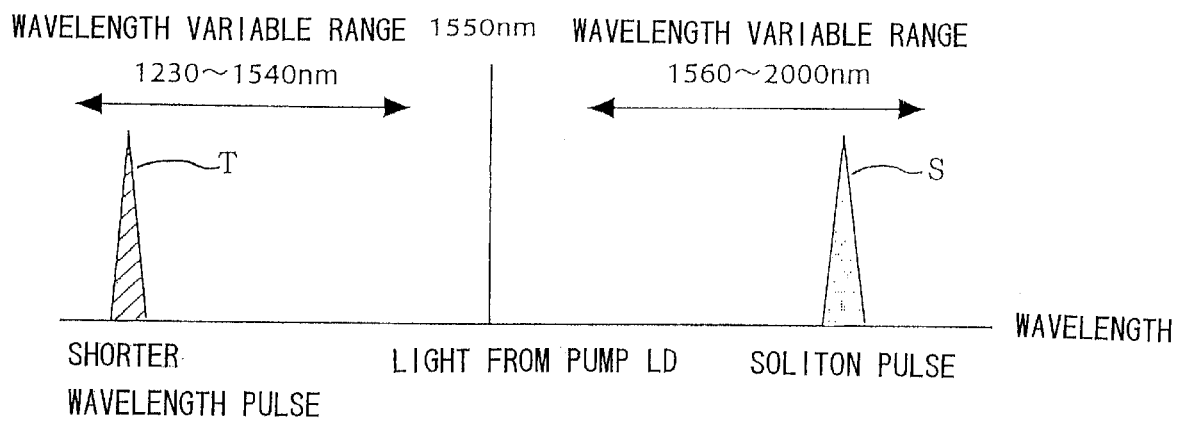

VARIABLE WAVELENGTH SHORT PULSE LIGHT GENERATING DEVICE AND METHOD

CROSSED-REFERENCE TO RELATED APPLICATIONS

This application is a National Phase Application (35 USC 371) of PCT/JP99/05276 and claims priority of Japanese Application No. 10-275604, filed Sep. 29, 1998.

TECHNICAL FIELD

The present invention relates to an apparatus and method for generating wavelength-tunable short optical pulses, and more particularly to an apparatus and method for generating wavelength-tunable short optical pulses on the order of femtosecond.

BACKGROUND ART

Until the present, generation of wavelength-tunable femtosecond optical pulses has been realized by use of a dye laser or a solid state laser. However, these lasers are relatively large apparatuses which require a large number of optical elements. Further, in such lasers, precise adjustment of the optical system must be performed in order to adjust the wavelength of generated pulses and to realize stable operation. Moreover, the variable range of wavelength is only about a few tens of nanometers, which is not sufficiently wide.

Recently, compact short-pulse lasers formed from optical fibers have been realized. However, as disclosed in Japanese Patent Application Laid-Open (kokai) No. 10-213827, conventional technical developments have attached importance to a manner of obtaining shorter optical pulses at a higher intensity and have failed to change the wavelength of output optical pulses.

P. Beaud et al. found that when short optical pulses are input to an optical fiber, new optical pulses are generated on the longer wavelength side [IEEE J. Quantum Electron., QE-23, p1938 (1987)).

DISCLOSURE OF THE INVENTION

However, the paper of P. Beaud et al. does not discuss the possibility of changing the wavelength of optical pulses. Further, since the authors used an ordinary fiber which is not a polarization-maintaining type, the output varied with time, and the obtained spectrum did not have a neat shape. Moreover, the efficiency of conversion from input energy to newly generated optical pulses was as low as about 45%, which is unsatisfactory.

Recently, parametric conversion using a nonlinear crystal has received a great deal of attention as a technique for conversion of wavelength of light. However, this method requires a very high pump light intensity. Further, since optical elements such as a crystal and mirrors must be adjusted in order to change the wavelength, handling of the apparatus is not easy.

An object of the present invention is to solve the above-described problem and to provide a compact apparatus and a method for generating wavelength-tunable short optical pulses, which apparatus and method can change the wavelength of generated pulses without adjustment of an optical system and enables generation of ideal femtosecond soliton pulses.

To achieve the above object, the present invention provides the following.

[1] An apparatus for generating wavelength-tunable short optical pulses, the apparatus comprising: a short-optical-pulse source; an optical characteristic regulation unit for regulating characteristics of light output from the short-optical-pulse source; and an optical fiber for receiving input pulses from the optical characteristic regulation unit and for changing the wavelength of output pulses linearly in accordance with the light intensity of the input pulses.

[2] An apparatus for generating wavelength-tunable short optical pulses as described in [1] above, wherein the optical characteristic regulation unit is a light intensity regulation unit.

[3] An apparatus for generating wavelength-tunable short optical pulses as described in [1] above, wherein the short-optical-pulse source is a femtosecond fiber laser.

[4] An apparatus for generating wavelength-tunable short optical pulses as described in [1] above, wherein the short-optical-pulse source is a picosecond fiber laser.

[5] An apparatus for generating wavelength-tunable short optical pulses as described in [1] above, wherein the optical fiber is a polarization-maintaining fiber.

[6] An apparatus for generating wavelength-tunable short optical pulses as described in [1] above, further comprising a nonlinear crystal connected to the optical fiber in order to generate short optical pulses of a different wavelength.

[7] An apparatus for generating wavelength-tunable short optical pulses as described in [1] above, further comprising four-wave mixing means for further converting the wavelength of generated optical pulses.

[8] An apparatus for generating wavelength-tunable short optical pulses as described in [1] above, further comprising an optical amplifier for amplifying optical pulses generated by the optical fiber.

[9] An apparatus for generating wavelength-tunable short optical pulses as described in [1] above, wherein the output pulses are ideal soliton pulses.

[10] An apparatus for generating wavelength-tunable short optical pulses as described in [2] above, further comprising means for electrically adjusting the light intensity regulation unit in order to control the wavelength of generated optical pulses.

[11] An apparatus for generating wavelength-tunable short optical pulses, the apparatus comprising: a short-optical-pulse source; a light intensity regulation unit for regulating the intensity of light output from the short-optical-pulse source; and an optical fiber for receiving input pulses from the light intensity regulation unit and for changing the wavelength of output pulses linearly, wherein the short-optical-pulse source, the light intensity regulation unit, and the optical fiber are assembled in the form of a portable apparatus.

[12] An apparatus for generating wavelength-tunable short optical pulses as described in [11] above, wherein the short-optical-pulse source is a femtosecond fiber laser.

[13] An apparatus for generating wavelength-tunable short optical pulses as described in [11] above, wherein the short-optical-pulse source is a picosecond fiber laser.

[14] A method for generating wavelength-tunable short optical pulses, the method comprising: regulating the intensity of light from a short-optical-pulse source; and inputting short pulses into an optical fiber in order to generate output pulses having a linearly varied wavelength.

[15] A method for generating wavelength-tunable short optical pulses as described in [14] above, wherein the wavelength of generated output pulses is changed through a change in the length of the optical fiber.

[16] A method for generating wavelength-tunable short optical pulses as described in [14] above, wherein the output pulses are passed through a nonlinear crystal in order to generate short optical pulses of a different wavelength.

[17] A method for generating wavelength-tunable short optical pulses as described in [14] above, wherein the wavelength of generated optical pulses is further converted by means of four-wave mixing.

[18] A method for generating wavelength-tunable short optical pulses as described in [14] above, wherein optical pulses generated by the optical fiber are amplified by use of an optical amplifier.

[19] A method for generating wavelength-tunable short optical pulses as described in [14] above, wherein ideal soliton pulses are generated as the output pulses.

[20] A method for generating wavelength-tunable short optical pulses as described in [14] above, wherein the light intensity regulation unit is adjusted electrically in order to control the wavelength of generated optical pulses.

[21] A method for generating wavelength-tunable short optical pulses as described in [14] above, wherein the pulse width, spectral width, and center wavelength of the soliton pulses are varied through changing the waveform and spectral width of the input pulses.

[22] A method for generating wavelength-tunable short optical pulses as described in [14] above, wherein the wavelength and spectrum of the soliton pulses are varied through changing the direction of polarization of the input pulses.

[23] A method for generating wavelength-tunable short optical pulses as described in [14] above, wherein in addition to soliton pulses generated on the longer wavelength side, anti-Stokes pulses are generated on the shorter wavelength side as the output pulses.

BRIEF DESCRIPTION OF THE DRAWINGS

FIG. 10 is a graph showing the relationship between the wavelengths and the frequencies of pump light, a soliton pule, and an optical pulse generated through the four-wave mixing shown in FIG. 9;

BEST MODE FOR CARRYING OUT THE INVENTION

Embodiments of the present invention will now described in detail.

First, a first embodiment of the present invention will be described.

Figure 1:
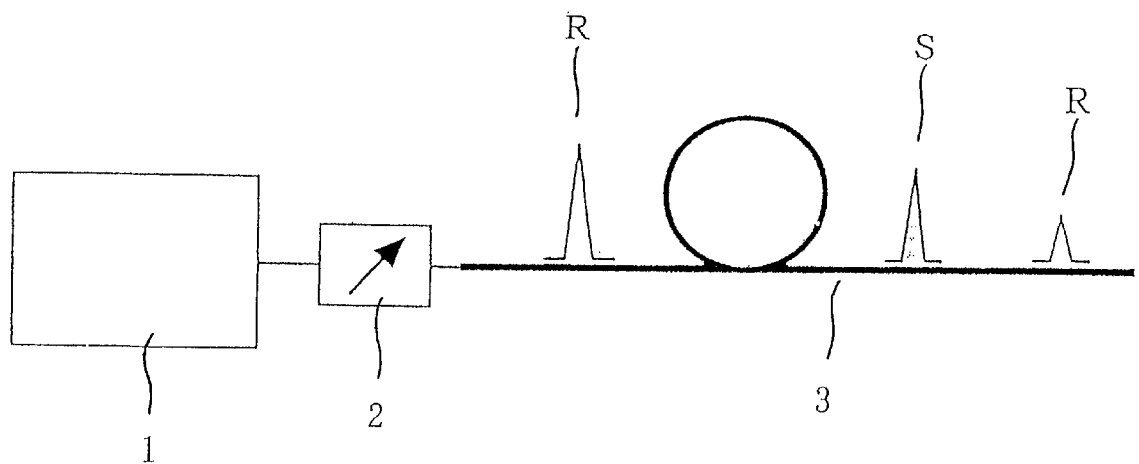
FIG. 1 is a schematic diagram of a wavelength-tunable short optical pulse generation apparatus according to a first embodiment of the present invention.

FIG. 1 is a schematic diagram of a wavelength-tunable short optical pulse generation apparatus according to the first embodiment of the present invention.

In FIG. 1, reference numeral 1 denotes a short-optical-pulse source; 2 denotes an optical characteristic regulation unit for regulating the characteristics of light output from the short-optical-pulse source 1; 3 denotes an optical fiber for receiving input pulses from the optical characteristic regulation unit 2 and for changing the wavelength of output pulses linearly; reference character R denotes a pump pulse; and S denotes a soliton pulse.

As shown in FIG. 1, the compact short-optical-pulse source (fiber laser) 1 capable of stably generating femtosecond optical pulses is used as a pump light source (short-optical-pulse source). The optical pulse output from the short-optical-pulse source 1 is passed through the optical characteristic regulation unit 2, so the optical pulse is regulated to have desired optical characteristics. Subsequently, the optical pulse is input to the optical fiber 3. When the optical fiber 3 is sufficiently long and the intensity of input light is sufficiently high, a new optical pulse is generated on the longer wavelength side with respect to the input pulse, due to stimulated Raman scattering.

Due to self-phase modulation and soliton effect, which is the interaction of wavelength dispersion, the new optical pulse gradually becomes an ideal soliton pulse S whose pulse and spectral waveforms assume a $\text{sech}^2$ shape. As the soliton pulse S propagates along the optical fiber 3, the center of the spectrum of the soliton pulse S shifts toward the longer wavelength side, due to the Raman scattering effect. This effect is called "soliton self frequency shift." Since the degree of frequency shift changes depending on the length of the optical fiber 3 and the intensity of the input optical pulse, the degree of frequency shift can be adjusted through changing the length of the optical fiber 3 and the intensity of the input optical pulse. Particularly, the degree of frequency shift can be changed linearly through changing the intensity of the input optical pulse.

Next, there will be described a second embodiment in which the above-described wavelength-tunable short optical pulse generation apparatus is rendered more concrete.

Figure 2:
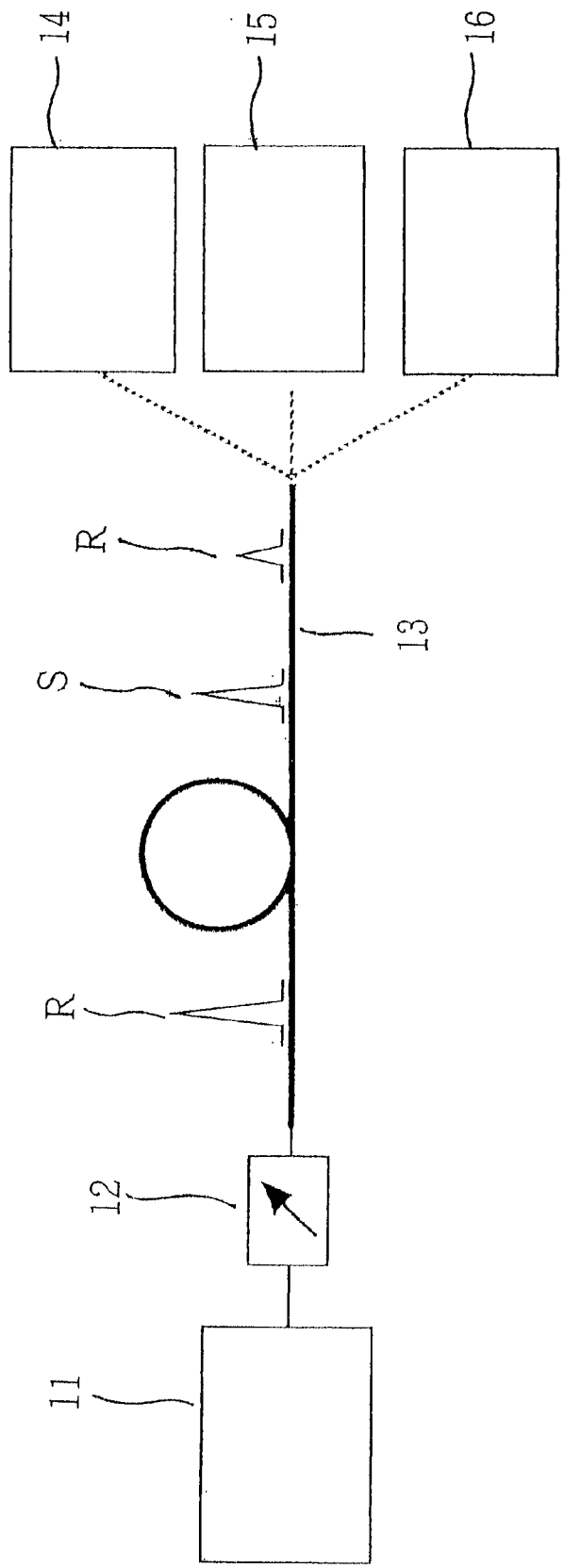
FIG. 2 is a schematic diagram of a wavelength-tunable femtosecond soliton pulse generation apparatus according to a second embodiment of the present invention.

FIG. 2 is a schematic diagram of a wavelength-tunable femtosecond soliton pulse generation apparatus according to the second embodiment of the present invention.

In FIG. 2, reference numeral 11 denotes a femtosecond fiber laser; 12 denotes a light intensity regulation unit for regulating the intensity of light output from the fiber laser 11; and 13 denotes a polarization maintaining optical fiber for receiving input pulses from the light intensity regulation unit and for changing the wavelength of output pulses linearly. Reference numeral 14 denotes an optical spectrum analyzer; 15 denotes a pulse-width measurement unit; and 16 denotes an optical power meter. These are used to measure output pulses and do not serve as structural elements of the present invention.

The compact femtosecond fiber laser 11 capable of stably generating femtosecond optical pulses is used as a pump light source. The optical pulse output from the femtosecond fiber laser 11 is passed through the light intensity regulation unit 12, so that the optical pulse is regulated to have a desired intensity. Subsequently, the optical pulse is input to the polarization-maintaining optical fiber 13. The direction of polarization of the input light is made parallel to the birefringent axis of the polarization-maintaining optical fiber 13. When the optical fiber 13 is sufficiently long and the intensity of input light is sufficiently high, a new optical pulse is generated on the longer wavelength side with respect to the input pulse, due to stimulated Raman scattering.

Due to soliton effect, which is the interaction of self-phase modulation and wavelength dispersion, the new optical pulse gradually becomes an ideal soliton pulse S whose pulse and spectral waveforms assume a $sech^2$ shape. As the soliton pulse S propagates along the optical fiber 13, the center of the spectrum of the soliton pulse S shifts toward the longer wavelength side due to the Raman scattering effect. This effect is called "soliton self frequency shift." Since the degree of frequency shift changes depending on the length of the optical fiber 13 and the intensity of the input optical pulse, the degree of frequency shift can be adjusted through changing the length of the optical fiber 13 and the intensity of the input optical pulse. Particularly, the degree of frequency shift can be changed linearly through changing the intensity of the input optical pulse.

The femtosecond fiber laser 11 used in the present embodiment has the following specifications.

(1) Mechanical specifications:

| | |
|---|---|
| Size | Laser itself: 182 × 101 × 57 mm |
| | Controller: 249 × 305 × 72 mm |
| Weight | Laser itself: 3.0 kg |
| | Controller: 2.8 kg |

(2) Electrical specifications:

Power consumption (100 V, 0.63 $A_{max}$): 14 W (average), 22 W (maximum)

(3) Optical specifications:

Center wavelength: 1559 nm

Pulse width: 190–760 fs (variable)
 (used at 190 fs in the experiment)

Recurrence frequency: 48.9 MHz

Average output: 11.1 mW (at 760 fs)–36.1 mW (at 190 fs)
 (used at 36.1 mW in the experiment)

Durability: Life of semiconductor laser: 2 years
 (replaceable)

The fiber used in the experiment has the following specifications.

Core diameter: 5.5±0.5 $\mu$m

Optical loss: 2.6 dB/km (for light of 1550 nm wavelength)

Length: 110 m, 75 m, 40 m

Figure 3:
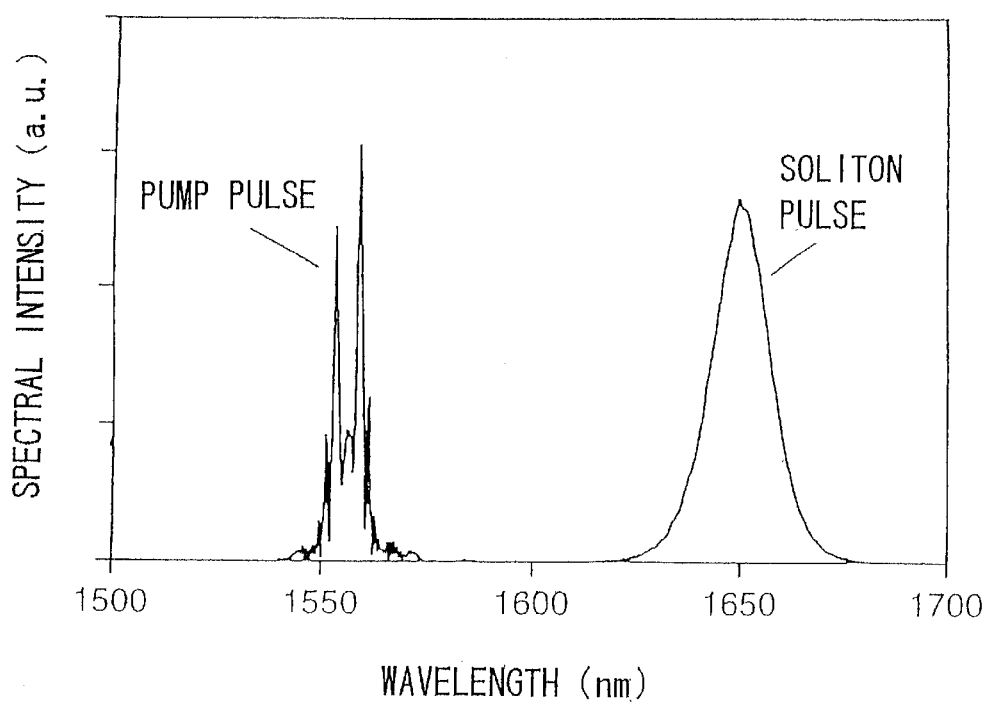
FIG. 3 is a graph relating to the second embodiment and showing results of measuring a spectrum of soliton pulses at the output of an optical fiber.

FIG. 3 is a graph relating to the second embodiment and showing results of measuring a spectrum of soliton pulses at the output of an optical fiber. In the measurement, optical pulses of 6.1 mW were input to a 75 m optical fiber, and the spectrum of generated soliton pulses was measured.

As shown in FIG. 3, the spectrum of the pump pulse R input to the optical fiber appears in the vicinity of 1558 nm. The spectrum of the soliton pulse S appears in the vicinity of 1650 nm, which is greatly shifted toward the longer wavelength side from the wavelength of 1558 nm. Further, as is understood from FIG. 3, the trace of the spectrum assumes a neat $sech^2$ shape. The spectrum width is about 16 nm, and the pulse width is 180 fs. Further, even when the intensity of the input light was increased to thereby shift the spectrum, the neat $sech^2$-shaped trace of the spectrum was maintained.

Figure 4:
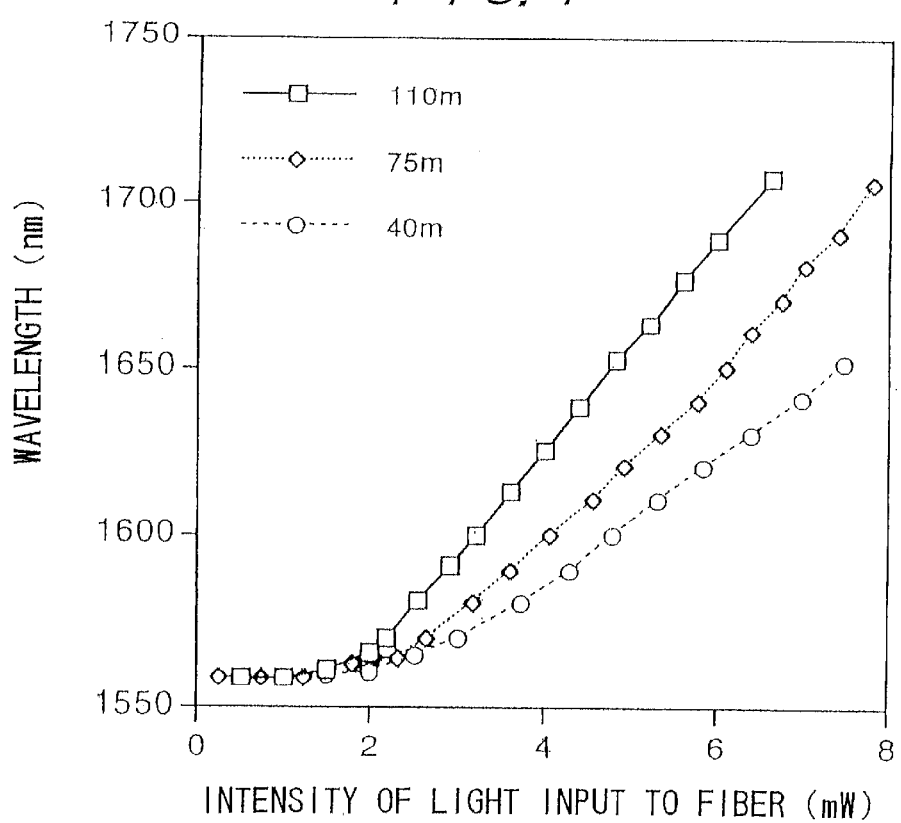
FIG. 4 is a graph relating to the second embodiment and showing variation in the center wavelength of a spectrum of soliton pulses with the intensity of light input to the optical fiber.

FIG. 4 is a graph relating to the second embodiment and showing, for each of 40 m, 75 m, and 110 m optical fibers, variation in the center wavelength of a spectrum of soliton pulses with the intensity of light input to the optical fiber.

When the intensity of the input light is rendered greater than 2 mW, the center wavelength of the soliton pulse increases linearly. The rate of shift of wavelength increases with fiber length. A maximum spectrum shift of about 150 nm (center wavelength: 1710 nm) was observed in the case of the 110 m fiber and in the case of the 75 m fiber. Further, through an increase in the intensity of the input light and an increase in the fiber length, the wavelength of the soliton pulse can be shifted up to about 2 $\mu$m.

As is understood from the above description for the wavelength-tunable femtosecond soliton pulse generation apparatus (see FIG. 2), since the apparatus consists of a compact fiber laser and an optical fiber having a length of a few tens to a few hundreds of meters, the overall apparatus is very compact and portable. That is, through integration of the optical fiber with the fiber laser, a portable optical pulse generator can be realized. Further, the wavelength of the soliton pulse can be varied linearly through a simple operation of changing the input light intensity.

Figure 5:
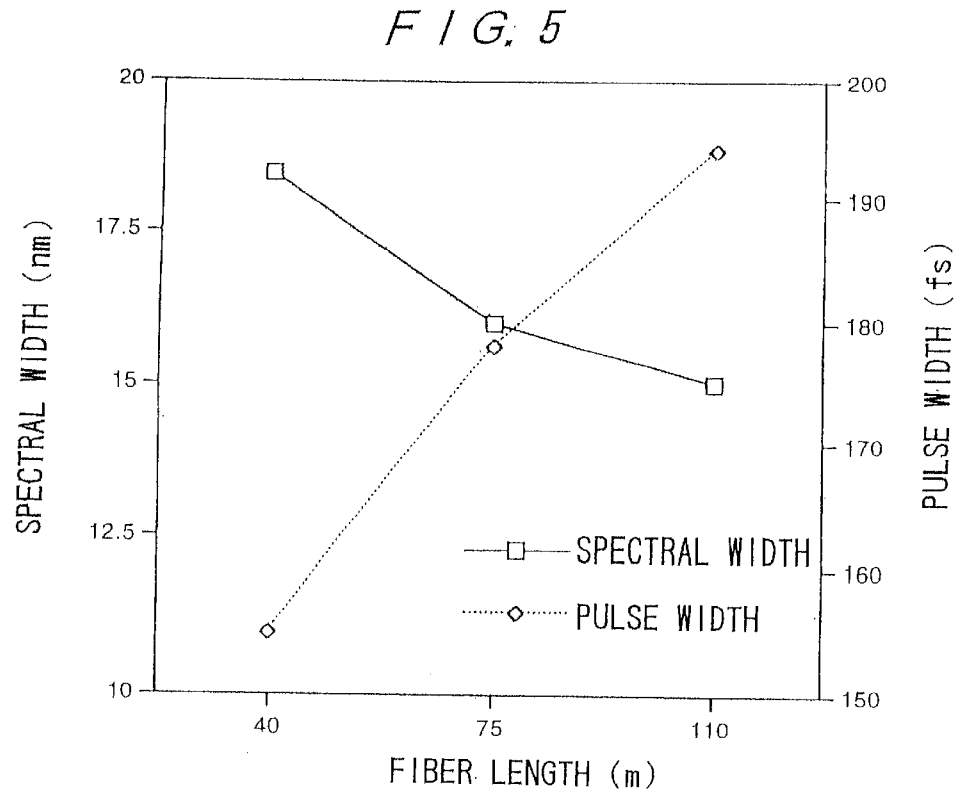
FIG. 5 is a graph relating to the second embodiment and showing the relationship among optical fiber length, spectral width, and pulse width.

FIG. 5 is a graph relating to the second embodiment and showing the relationship among optical fiber length, spectral width, and pulse width.

As is apparent from FIG. 5, there is observed a trend such that as the optical fiber length increases, the spectral width decreases and the pulse width increases. When the optical fiber length is varied within the range of 40 to 110 m, the spectral width changes from 15 to 18 nm, and the pulse width changes from 155 to 195 fs. Therefore, the pulse width and spectral width of the soliton pulse can be varied through changing the length of the optical fiber used in the wavelength-tunable short optical pulse generation apparatus (see FIG. 2).

Figure 6:
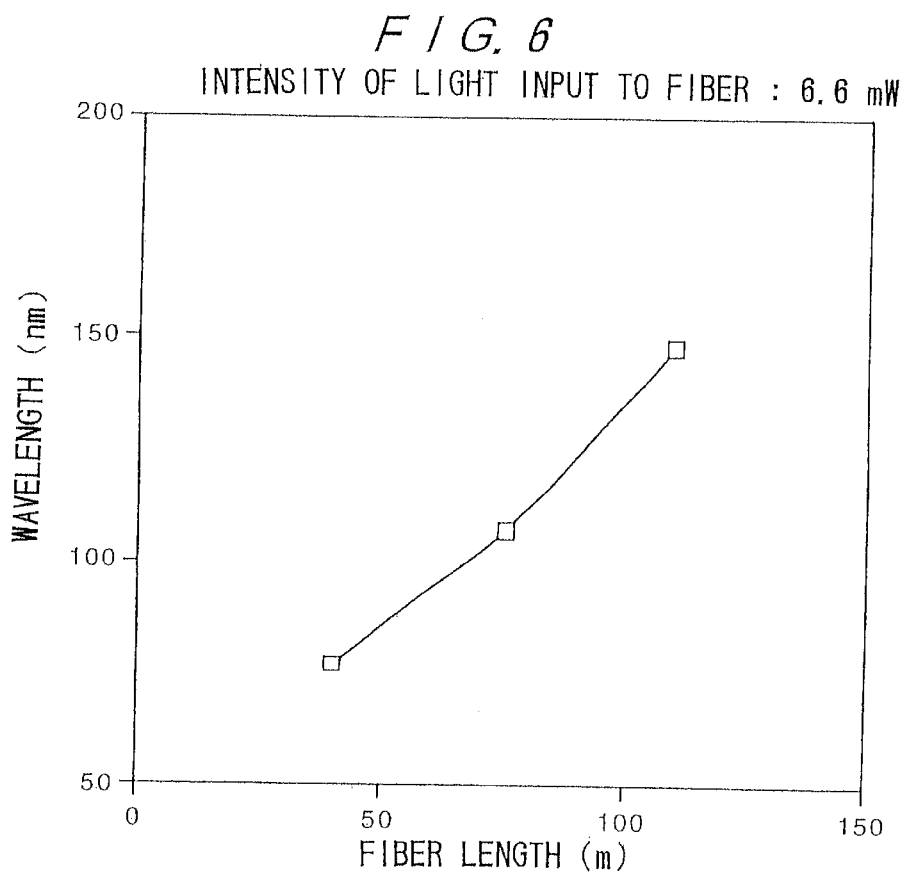
FIG. 6 is a graph relating to the second embodiment and showing the relationship between fiber length and wavelength shift.

FIG. 6 is a graph relating to the second embodiment and showing the relationship between fiber length and wavelength shift.

As is apparent from FIG. 6, the degree of shift in wavelength increases monotonously as the optical fiber length increases. This is because the wavelength shifts toward the longer wavelength side at an increasing rate, due to soliton self frequency shift as the optical pulse propagates along the optical fiber. As described above, the wavelength of the soliton pulse can be varied through changing the length of the optical fiber.

Next, a third embodiment of the present invention will be described.

Figure 7:
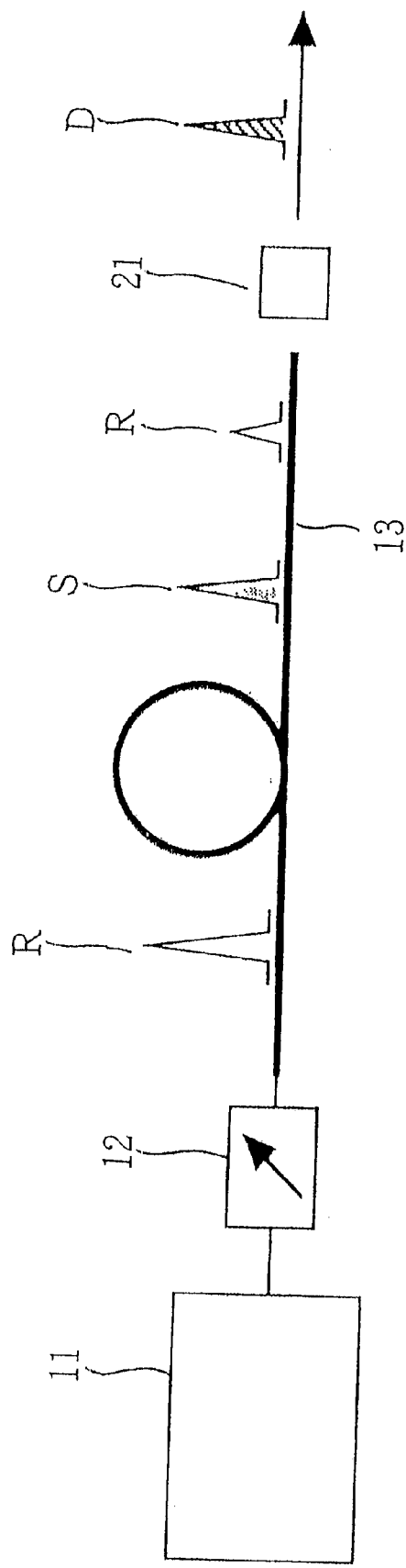
FIG. 7 is a schematic diagram of a wavelength-tunable femtosecond soliton pulse generation apparatus according to a third embodiment of the present invention.

FIG. 7 is a schematic diagram of a wavelength-tunable femtosecond soliton pulse generation apparatus according to the third embodiment of the present invention. Components which are the same as those in FIG. 2 are denoted by the same reference numerals, and repetition of their descriptions is omitted.

There will now be described an experiment in which the output light of the wavelength-tunable femtosecond soliton pulse generation apparatus described in the second embodiment is passed through a nonlinear crystal 21 to thereby generate a second harmonic short pulse D of the soliton pulse.

Since the optical pulse generated at the wavelength-tunable femtosecond soliton pulse generation apparatus has a peak power of a few hundreds of W, as shown in FIG. 7, the second harmonic short pulse D can be generated through use of the nonlinear crystal 21. When output light from the polarization maintaining optical fiber 13 is input to the nonlinear crystal 21 such as a KTP and the angle of the crystal is properly adjusted, short optical pulses having a wavelength of 780 to 1000 nm can be generated from soliton pulses S having a wavelength of 1550 to 2000 nm. Upon changing the wavelength of the soliton pulse S, the wavelength of the second harmonic pulse D can be changed accordingly.

Figure 8:
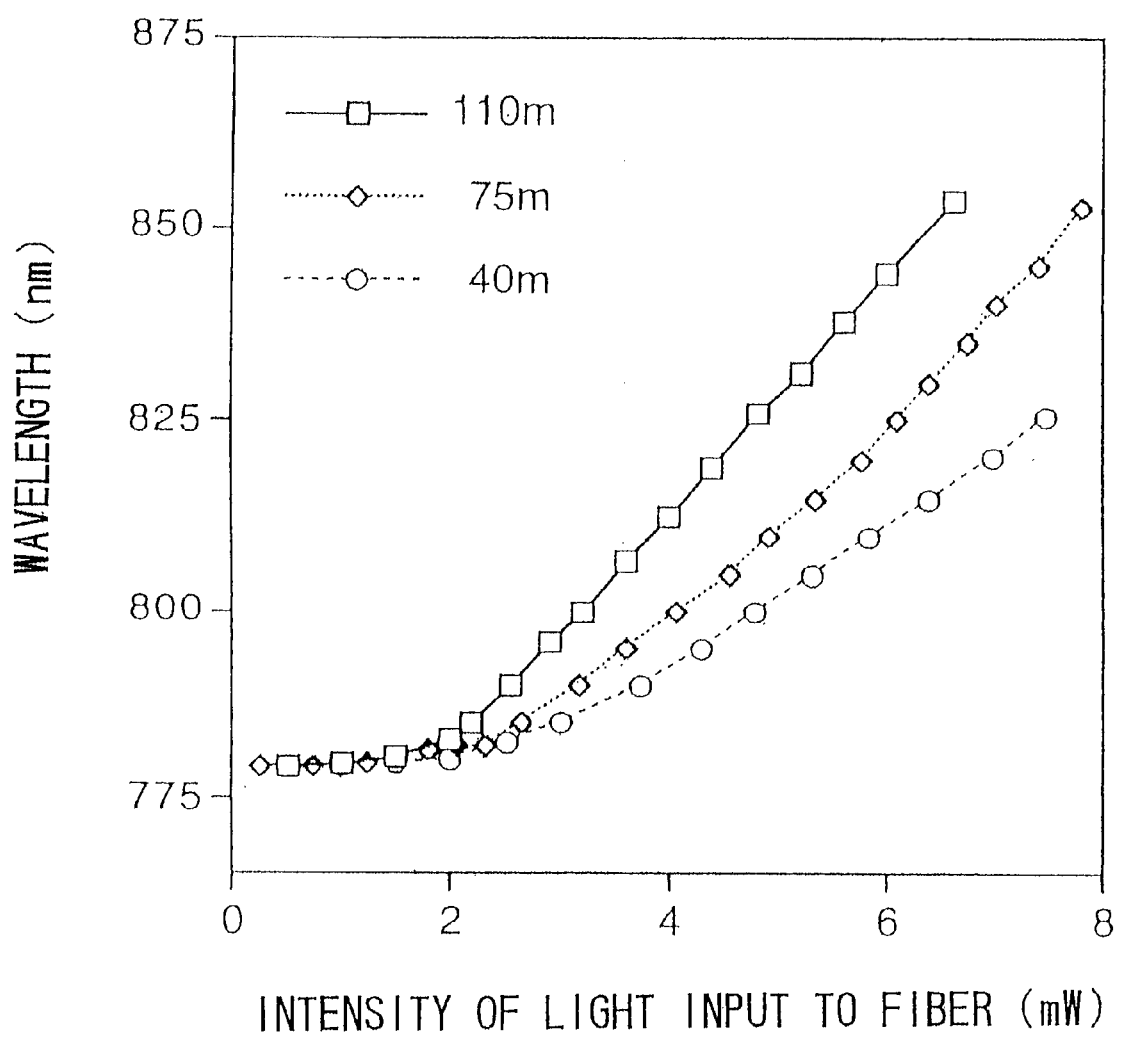
FIG. 8 is a graph showing the dependency on input light intensity of the center wavelength of the second harmonic generated by the wavelength-tunable femtosecond soliton pulse generation apparatus according to the third embodiment of the present invention.

FIG. 8 is a graph showing, for each of the 40 m, 75 m, and 110 m optical fibers, the dependency on input light intensity of the center wavelength of the second harmonic pulse generated by the wavelength-tunable femtosecond soliton pulse generation apparatus according to the third embodiment of the present invention.

Since the wavelength of the soliton pulse varies linearly through changing the input light intensity, the wavelength of the second harmonic short pulse shifts linearly. The greater the input light intensity, the greater the rate of shift, and the greater the optical fiber length, the greater the rate of shift.

Next, a fourth embodiment of the present invention will be described.

Figure 9:
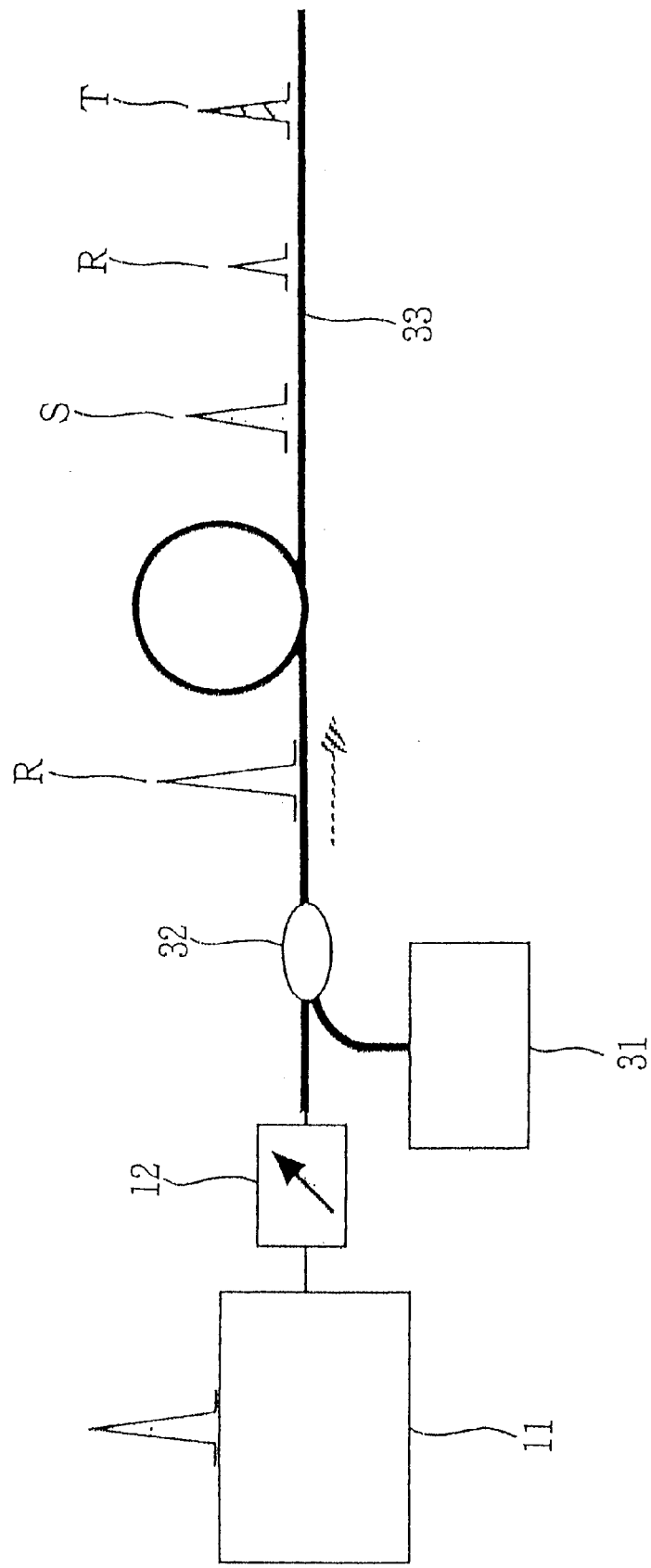
FIG. 9 is a schematic diagram of a wide-band femtosecond-soliton-pulse generation apparatus which effects wavelength conversion through four-wave mixing, showing a fourth embodiment of the present invention.

FIG. 9 is a schematic diagram of a wide-band femtosecond-soliton-pulse generation apparatus which effects wavelength conversion through four-wave mixing, showing the fourth embodiment of the present invention.

As shown in FIG. 9, in addition to pump pulses from the light intensity regulation unit 12, pump laser light output from a pump semiconductor laser (pump LD) 31 and having a different wavelength is input to an optical fiber 33 via a coupler 32, which assumes the form of, for example, a fiber coupler.

As described above, each pump pulse R causes generation of a soliton pulse S on the longer wavelength side. This soliton pulse S and the pump laser light output from the pump laser (femtosecond fiber laser) 11 undergo four-wave mixing, so that a new optical pulse is generated at a frequency equal to the difference between the frequency of the soliton pulse S and that of the pump laser light, as well as at a frequency equal to the sum of the frequency of the soliton pulse S and that of the pump laser light. Optical pulses can be generated within the range of, for example, 1230 to 1550 nm through changing the wavelengths of the soliton pulse and the pump laser light.

FIG. 10 is a graph showing the relationship between the wavelengths and the frequencies of the pump light, the soliton pulse, and the optical pulse generated through the four-wave mixing.

In the four-wave mixing, due to interaction of the light from the pump LD 31 and the soliton pulse, a new optical pulse is generated on both the shorter wavelength side and the longer wavelength side. When the frequency of the light from the pump LD 31 is represented by $\omega 0$ and the frequency of the soliton pulse is represented by $\omega 1$, the frequencies of the generated optical pulses can be represented by $2\omega 0 - \omega 1$ and $2\omega 1 - \omega 0$, respectively. Since the efficiency of conversion to the longer wavelength side is expected to be low due to the characteristics of the optical fiber, attention is paid to the optical pulse generated on the shorter wavelength side.

Since the wavelength of the soliton pulse S can be varied within the range of 1560 to 2000 nm, when the wavelength of the light from the pump LD 31 is set to 1550 nm, the wavelength of the shorter wavelength pulse T generated on the shorter wavelength side can be varied within the range of 1230 to 1540 nm. Since the wavelength of the soliton pulse S varies linearly with the intensity of input light, the wavelength of the output pulse obtained from four-wave mixing also varies linearly. Accordingly, the wavelength of the output pulse can be varied by the input light intensity.

Next, a fifth embodiment of the present invention will be described.

Figure 11:
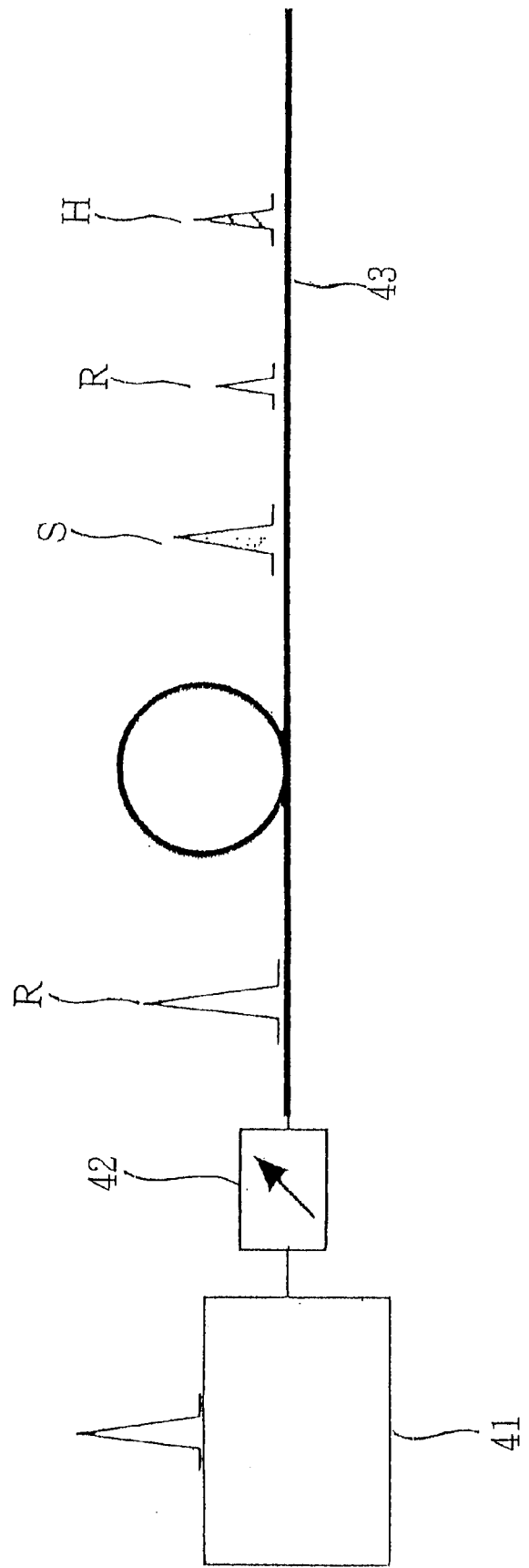
FIG. 11 is a schematic diagram of a wavelength-tunable femtosecond soliton pulse generation apparatus according to a fifth embodiment of the present invention, which utilizes a small-diameter polarization-maintaining optical fiber.

FIG. 11 is a schematic diagram of a wavelength-tunable femtosecond soliton pulse generation apparatus according to the fifth embodiment of the present invention, which utilizes an optical fiber.

In FIG. 11, reference numeral 41 denotes a femtosecond fiber laser; 42 denotes a light intensity regulation unit for regulating the intensity of light output from the fiber laser 41; and 43 denotes an optical fiber for receiving input pulses from the light intensity regulation unit 42 and for changing the wavelength of output pulses linearly. Reference character R denotes a pump pulse; S denotes a soliton pulse (a Stokes pulse); and H denotes an anti-Stokes pulse.

Figure 12:
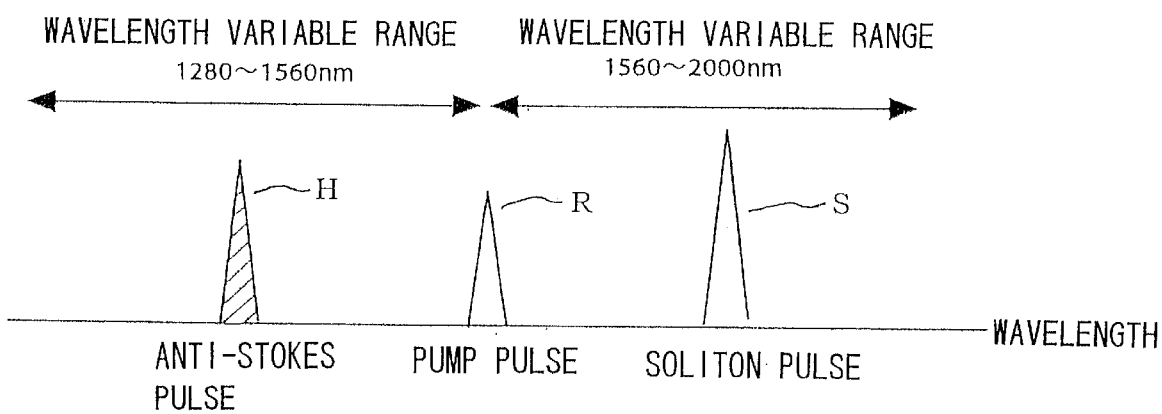
FIG. 12 is a graph relating to the fifth embodiment and showing the spectrum of output light subjected to wavelength conversion.

In the present invention, as shown in FIG. 12, the anti-Stokes pulse H is generated on the shorter wavelength side, in addition to the soliton pulse S which is generated on the longer wavelength side as in the wavelength-tunable femtosecond soliton pulse generation apparatus according to the second embodiment. The wavelength of the anti-Stokes pulse H shifts toward the shorter wavelength side, which is contrary to the case of the soliton pulse S. When the wavelength of the soliton pulse shifts from 1560 nm to 2000 nm, the wavelength of the anti-Stokes pulse H shifts from 1560 nm to 1280 nm. Combined use of the soliton pulse S and the anti-Stokes pulse H enables realization of an optical pulse source capable of generating wavelength-tunable optical pulses within a wide range of 1280 to 2000 nm.

Next, a sixth embodiment of the present invention will be described.

Figure 13:
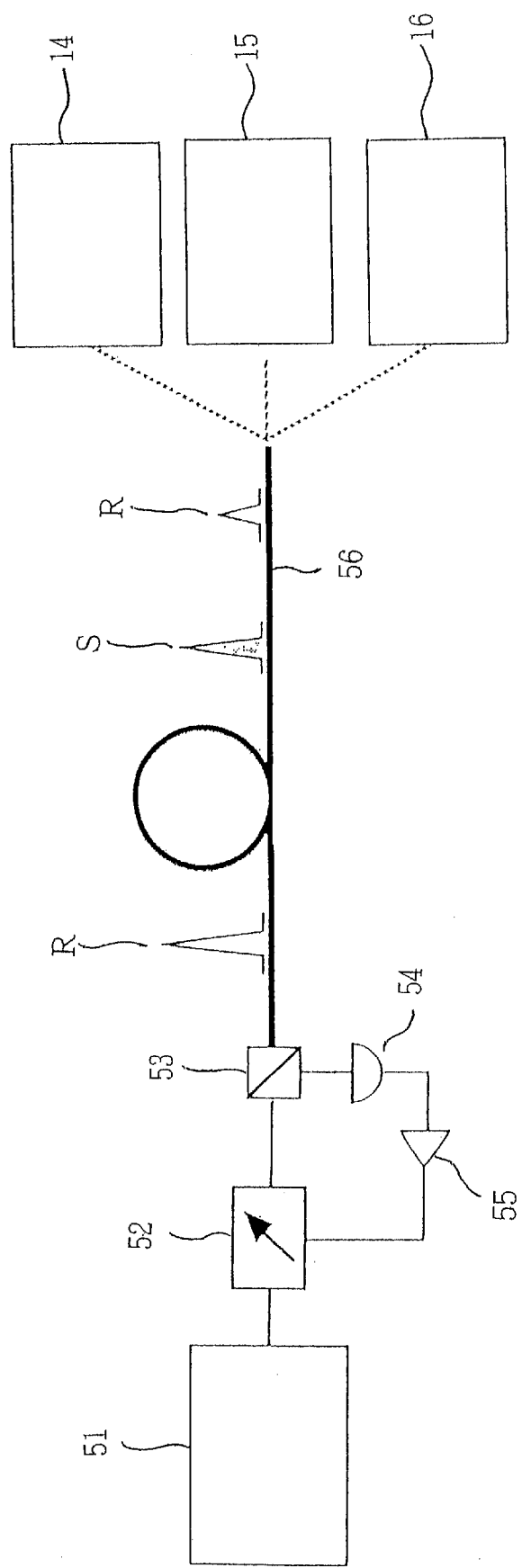
FIG. 13 is a schematic diagram of a wavelength-tunable femtosecond soliton pulse generation apparatus according to a sixth embodiment of the present invention, which is provided with a wavelength controller.

FIG. 13 is a schematic diagram of a wavelength-tunable femtosecond soliton pulse generation apparatus according to the sixth embodiment of the present invention, which is provided with a wavelength controller.

In FIG. 13, reference numeral 51 denotes a femtosecond fiber laser; 52 denotes a light intensity regulation unit for regulating the intensity of light output from the fiber laser 51; 53 denotes an optical branching unit; 54 denotes a light reception unit; 55 denotes a controller; and 56 denotes a polarization-maintaining optical fiber for receiving input pulses from the optical branching unit 53 and for changing the wavelength of output pulses linearly. Reference character R denotes a pump pulse; and S denotes a soliton pulse (Stokes pulse). Reference numeral 14 denotes an optical spectrum analyzer; 15 denotes a pulse-width measurement unit; and 16 denotes an optical power meter. These are used to measure output pulses and do not serve as structural elements of the present invention.

The present embodiment is a modification of the wavelength-tunable femtosecond soliton pulse generation apparatus of the second embodiment (see FIG. 2). The optical branching unit 53 branches a portion of output light output from the light intensity regulation unit 52 in order to enable the light reception unit 54 to monitor the intensity of the output light, on the basis of which the controller 55 adjusts the amount of transmitted light to a desired level to thereby stably control the wavelength of the pulse output from the fiber 56.

Next, a seventh embodiment of the present invention will be described.

Figure 14:
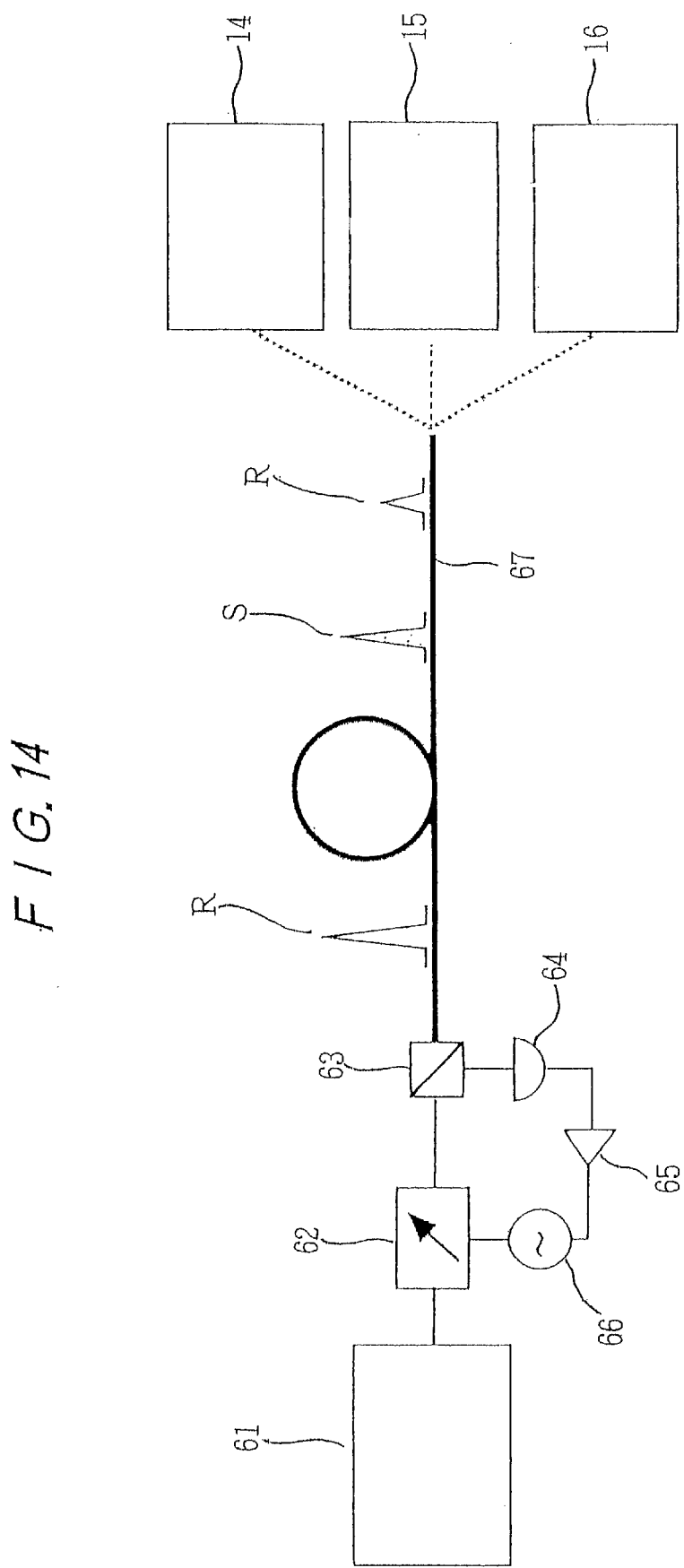
FIG. 14 is a schematic diagram of a wavelength-tunable femtosecond soliton pulse generation apparatus according to a seventh embodiment of the present invention, which is provided with a wavelength controller.

FIG. 14 is a schematic diagram of a wavelength-tunable femtosecond soliton pulse generation apparatus according to the seventh embodiment of the present invention, which is provided with a wavelength controller.

In FIG. 14, reference numeral 61 denotes a femtosecond fiber laser; 62 denotes a light intensity regulation unit for regulating the intensity of light output from the fiber laser 61; 63 denotes an optical branching unit; 64 denotes a light reception unit; 65 denotes a controller; 66 denotes an oscillator; and 67 denotes a polarization-maintaining optical fiber for receiving input pulses from the optical branching unit 63 and for changing the wavelength of output pulses linearly. Reference character R denotes a pump pulse; and S denotes a soliton pulse (Stokes pulse). Reference numeral 14 denotes an optical spectrum analyzer; 15 denotes a pulse-width measurement unit; and 16 denotes an optical power meter. These are used to measure output pulses and do not serve as structural elements of the present invention.

The present embodiment is a modification of the wavelength-tunable femtosecond soliton pulse generation apparatus of the second embodiment (see FIG. 2). The wavelength of the soliton pulse S can be changed periodically through modulating operation of the light intensity regulation unit 62 at an arbitrary frequency. The modulation operation of the light intensity regulation unit 62 enables realization of a soliton pulse generator having a wavelength scan function.

Next, an eighth embodiment of the present invention will be described.

In the eighth embodiment, the wavelength-tunable femtosecond soliton pulse generation apparatus of the second embodiment (see FIG. 2) is modified such that the pulse and spectral widths of the optical pulse output from the femtosecond fiber laser can be adjusted in order to vary the pulse and spectral widths of the generated soliton pulse. A pulse having a narrow spectral width is important in measurement in which wavelength separation is required.

Next, a ninth embodiment of the present invention will be described.

In the ninth embodiment, the wavelength-tunable femtosecond soliton pulse generation apparatus of any of the second through fourth embodiments is modified such that a nonlinear amplifier such as a Raman optical amplifier is disposed at the output of the apparatus. In this case, a short optical pulse can be amplified without broadening the pulse width. Use of this technique enables amplification of a soliton pulse having a certain wavelength to an arbitrary level without broadening the pulse width.

Although a femtosecond fiber laser is used as a short-optical-pulse source, needless to say, the present invention can be applied to cases in which a picosecond fiber laser is used as a short-optical-pulse source. When a picosecond fiber laser is used, the following advantageous effects can be obtained.

When an optical fiber is excited by picosecond pulses, the degree of shift in wavelength with change in input light intensity is smaller than that in the case of femtosecond pulses, which enables precise tuning of wavelength. Such precise tuning of the wavelength of optical pulses is useful in the case in which precise wavelength adjustment is needed in applications such as spectroscopy and evaluation of devices for wavelength multiplex optical communications.

The present invention provides the following effects.

(1) A compact fiber laser capable of generating femtosecond pulses is used as a light source; and a nonlinear effect of a polarization-maintaining fiber is utilized. Therefore, wavelength can be varied linearly through a simple operation of changing the intensity of pump light. Further, a compact, portable source for generating femtosecond pulses can be obtained.

(2) A compact fiber laser capable of generating stable femtosecond pulses is used as a light source; and a polarization-maintaining optical fiber having a length of a few tens to a few hundreds of meters and a small core cross section is provided in combination with a light intensity regulation unit capable of changing light intensity continuously. Therefore, it is possible to obtain a portable optical pulse generator which can generate ideal femtosecond soliton pulses and which can vary the wavelength of the soliton pulses linearly within a broad band, through a simple operation of changing the light intensity.

(3) Ideal femtosecond soliton pulses can be generated stably. Further, the wavelength of the optical pulses can be varied linearly within a broad band, through a simple operation of changing the intensity of light input to the optical fiber, without necessity of adjustment of the optical system as in the prior art techniques. Moreover, since the overall apparatus is very small, the apparatus is rendered portable. In addition, the apparatus is nearly maintenance free.

Conceivably, the apparatus and method for generating wavelength-tunable short optical pulses of the present invention can be applied to a measurement apparatus for measuring the frequency characteristics and wavelength dependency of optical devices for wavelength multiplex communications.

Recently, with increased emphasis on information technology throughout society, an optical communication technique which can further increase the volume of transmission data has been demanded. In order to increase the volume of transmission data, techniques for increasing the speed of optical communications and multiplexing the wavelengths of light to be transmitted have been studied and developed. Under such circumstances, proper evaluation of characteristics of optical devices used in optical communication is indispensable. Particularly, the frequency characteristics and wavelength dependencies of light-emitting elements, optical modulators, and light-receiving elements are fundamental characteristics which determine the characteristics of a system. However, due to an increase in operating speed and a broadened operation band, evaluation of characteristics has become difficult.

The present invention enables evaluation of the wavelength dependency of an element over a wide band. Further, through measurement of a time response upon input of a femtosecond pulse, the frequency characteristic of an element can be determined. The importance of these techniques increases considerably with further increases in speed and bandwidth of wavelength multiplex communications.

Moreover, the wavelength-tunable short-optical-pulse generation apparatus of the present invention is compact and stable and can vary the wavelength of generated soliton pulses by changing the intensity of input light. Due to these advantages, the present invention is considered to be widely used in relation to high-speed spectroscopy and a high-speed light response technique in the fields of photochemistry and biology, as well as in the fields of high-speed optoelectronics and nonlinear optics.

The present invention is not limited to the above-described embodiments. Numerous modifications and variations of the present invention are possible in light of the spirit of the present invention, and they are not excluded from the scope of the present invention.

The present invention provides the following advantageous effects.

(A) When the optical fiber is sufficiently long and the intensity of input light is sufficiently high, a new optical pulse is generated on the longer wavelength side with respect to the input pulse, due to stimulated Raman scattering. Due to soliton effect, which is the interaction of self-phase modulation and wavelength dispersion, the new optical pulse gradually becomes an ideal soliton pulse whose pulse and spectrum waveforms assume a $sech^2$ shape. As the soliton pulse propagates along the optical fiber, the center of the spectrum of the soliton pulse shifts toward the longer wavelength side, due to the Raman scattering effect (this effect is called soliton self frequency shift). Since the degree of frequency shift changes depending on the length of the optical fiber and the intensity of the input optical pulse, the degree of frequency shift can be adjusted through changing the length of the optical fiber and the intensity of the input optical pulse. Particularly, the degree of frequency shift can be changed linearly through changing the intensity of the input optical pulse.

(B) A compact fiber laser capable of generating femtosecond pulses is used as a light source; and a nonlinear effect of a polarization-maintaining fiber is utilized. Therefore, wavelength can be varied linearly through a simple operation of changing the intensity of pump light. Further, a compact, portable source for generating femtosecond pulses can be obtained.

(C) A compact fiber laser capable of generating stable femtosecond pulses is used as a light source; and a polarization-maintaining optical fiber having a length of a few tens to a few hundreds of meters and a small core cross section is provided in combination with a light intensity regulation unit capable of changing light intensity continuously. Therefore, it is possible to obtain a portable optical pulse generator which can generate ideal femtosecond soliton pulses and which can vary the wavelength of the soliton pulses linearly within a broad band, through a simple operation of changing the light intensity.

(D) Ideal femtosecond soliton pulses can be generated stably. Further, the wavelength of the optical pulses can be varied linearly within a broad band, through a simple operation of changing the intensity of light input to the optical fiber, without necessity of adjustment of the optical system. Moreover, the entire apparatus can be made very small. In addition, the apparatus is nearly maintenance free.

(E) The wavelength of femtosecond soliton pulses can be varied within the range of 1560 to 1701 nm. Further, through optimization of the experimental system, the wavelength can be varied up to about 2000 nm.

(F) When output light from the wavelength-tunable femtosecond soliton pulse generator is passed through a non-linear crystal, short optical pulses of the second harmonic can be obtained. The wavelength of the short optical pulses can be varied linearly within the range of 780 to 1000 nm by changing the wavelength of the generated soliton pulses within the range of 1550 to 2000 nm.

(G) When an optical fiber is excited by picosecond pulses according to the present invention, precise wavelength tuning becomes possible, because the degree of shift in wavelength with change in input light intensity is smaller than that in the case of femtosecond pulses. Such precise tuning of the wavelength of optical pulses is useful in the case in which precise wavelength adjustment is needed in applications such as spectroscopy and evaluation of devices for wavelength multiplex optical communications.

(H) When, in addition to input pulses from a laser, laser light having a different wavelength is input to an optical fiber, due to four-wave mixing in the optical fiber, a new optical pulse is generated on the shorter wavelength side and the longer wavelength side. That is, the new optical pulse is generated at a frequency equal to the difference between the frequency of the soliton pulse and that of the laser light, as well as at a frequency equal to the sum of the frequency of the soliton pulse and that of the laser light. Optical pulses can be generated within the range of, for example, 1230 to 1550 nm through changing the wavelengths of the soliton pulse and the pump laser light. Further, use of anti-Stokes pulses generated on the shorter wavelength side enables generation of short optical pulses within a wide range.

(I) Soliton pulses generated within an optical fiber can be amplified by use of an optical-fiber Raman amplification effect without broadening the pulse width.

INDUSTRIAL APPLICABILITY

The apparatus and method for generating wavelength-tunable short optical pulses according to the present invention can be widely used in relation to high-speed spectroscopy and a high-speed light response technique in the fields of photochemistry and biology, as well as in the fields of high-speed optoelectronics and nonlinear optics.

What is claimed is:

1. An apparatus for generating wavelength-tunable short optical pulses, the apparatus comprising:

(a) a short-optical-pulse source which is a femtosecond fiber laser or picosecond fiber laser;

(b) an optical characteristic regulation unit for regulating characteristics of light output from the short-optical-pulse source; and (c) an optical fiber for receiving input pulses from the optical characteristic regulation unit and for changing the wavelength of output pulses linearly in accordance with the light intensity of the input pulses.

2. An apparatus for generating wavelength-tunable short optical pulses according to claim 1, wherein the optical characteristic regulation unit is a light intensity regulation unit.

3. An apparatus for generating wavelength-tunable short optical pulses according to claim 1, wherein the short-optical-pulse source is a femtosecond fiber laser.

4. An apparatus for generating wavelength-tunable short optical pulses according to claim 1, wherein the short-optical-pulse source is a picosecond fiber laser.

5. An apparatus for generating wavelength-tunable short optical pulses according to claim 1, wherein the optical fiber is a polarization-maintaining fiber.

6. An apparatus for generating wavelength-tunable short optical pulses according to claim 1, further comprising a nonlinear crystal connected to the optical fiber in order to generate short optical pulses of a different wavelength.

7. An apparatus for generating wavelength-tunable short optical pulses according to claim 1, further comprising four-wave mixing means for further converting the wavelength of generated optical pulses.

8. An apparatus for generating wavelength-tunable short optical pulses according to claim 1, further comprising an optical amplifier for amplifying optical pulses generated by the optical fiber.

9. An apparatus for generating wavelength-tunable short optical pulses according to claim 1, wherein the output pulses are ideal soliton pulses.

10. An apparatus for generating wavelength-tunable short optical pulses according to claim 2, further comprising means for electrically adjusting the light intensity regulation unit in order to control the wavelength of generated optical pulses.

11. An apparatus for generating wavelength-tunable short optical pulses, the apparatus comprising:

(a) a short-optical-pulse source which is a femtosecond fiber laser or a picosecond fiber laser;

(b) a light intensity regulation unit for regulating the intensity of light output from the short-optical-pulse source; and (c) an optical fiber for receiving input pulses from the light intensity regulation unit and for changing the wavelength of output pulses linearly, wherein (d) the short-optical-pulse source, the light intensity regulation unit, and the optical fiber are assembled in the form of a portable apparatus.

12. An apparatus for generating wavelength-tunable short optical pulses according to claim 11, wherein the short-optical-pulse source is a femtosecond fiber laser.

13. An apparatus for generating wavelength-tunable short optical pulses according to claim 11, wherein the short-optical-pulse source is a picosecond fiber laser.

14. A method for generating wavelength-tunable short optical pulses, the method comprising: regulating the intensity of light from a short-optical-pulse source; and inputting short pulses into an optical fiber in order to generate, by four-wave mixing, output pulses having a linearly varied wavelength.

15. A method for generating wavelength-tunable short optical pulses according to claim 14, wherein the wavelength of generated output pulses is changed through a change in the length of the optical fiber.

16. A method for generating wavelength-tunable short optical pulses according to claim 14, wherein the output pulses are passed through a nonlinear crystal in order to generate short optical pulses of a different wavelength.

17. A method for generating wavelength-tunable short optical pulses according to claim 14, wherein in addition to soliton pulses generated on the longer wavelength side, anti-Stokes pulses are generated on the shorter wavelength side as the output pulses.

18. A method for generating wavelength-tunable short optical pulses according to claim 14, wherein optical pulses generated by the optical fiber are amplified by use of an optical amplifier.

19. A method for generating wavelength-tunable short optical pulses according to claim 14, wherein ideal soliton pulses are generated as the output pulses.

20. A method for generating wavelength-tunable short optical pulses according to claim 14, wherein the light intensity regulation unit is adjusted electrically in order to control the wavelength of generated optical pulses.

* * * * *